(12) United States Patent
Hentze et al.

(10) Patent No.: US 8,460,791 B2
(45) Date of Patent: Jun. 11, 2013

(54) POLYELECTROLYTE-MODIFIED MICROCAPSULES

(75) Inventors: Hans-Peter Hentze, Mannheim (DE); Dieter Niederberger, Ludwigshafen (DE); Hans Willax, Maxdorf (DE); Joachim Burger, Midlevels/Central Hong Kong (CN); Daniel Pascual Gienap, Murcia (ES)

(73) Assignee: BASF Aktiengesellschaft, Ludwigshafen (DE)

(*) Notice: Subject to any disclaimer, the term of this patent is extended or adjusted under 35 U.S.C. 154(b) by 714 days.

(21) Appl. No.: 12/307,926

(22) PCT Filed: Jul. 5, 2007

(86) PCT No.: PCT/EP2007/056786
§ 371 (c)(1),
(2), (4) Date: Jan. 8, 2009

(87) PCT Pub. No.: WO2008/006762
PCT Pub. Date: Jan. 17, 2008

(65) Prior Publication Data
US 2009/0256107 A1 Oct. 15, 2009

(30) Foreign Application Priority Data
Jul. 13, 2006 (EP) ................................ 06117092
Oct. 17, 2006 (EP) ................................ 06122418

(51) Int. Cl.
*B32B 3/26* (2006.01)
*B32B 5/16* (2006.01)

(52) U.S. Cl.
USPC .............. 428/402.2; 428/402.21; 428/402.24; 428/320.2; 427/213.31

(58) Field of Classification Search
USPC .......... 428/402.2; 430/171; 252/73; 525/398; 510/130
See application file for complete search history.

(56) References Cited

U.S. PATENT DOCUMENTS

| | | | |
|---|---|---|---|
| 5,955,188 A * | 9/1999 | Pushaw | 428/320.2 |
| 6,375,968 B1 | 4/2002 | Quong | |
| 6,479,146 B1 | 11/2002 | Caruso et al. | |
| 6,514,362 B1 | 2/2003 | Zuckerman et al. | |
| 6,699,501 B1 | 3/2004 | Neu et al. | |
| 2003/0118822 A1 | 6/2003 | Jahns et al. | |
| 2003/0125222 A1 * | 7/2003 | Jahns et al. | 510/130 |
| 2006/0039976 A1 | 2/2006 | Odidi et al. | |
| 2008/0033075 A1 | 2/2008 | Schmidt et al. | |
| 2008/0318048 A1 | 12/2008 | Amrhein et al. | |

FOREIGN PATENT DOCUMENTS

| | | |
|---|---|---|
| EP | 1064087 A2 | 1/2001 |
| EP | 1 321 182 A1 | 6/2003 |
| JP | 55-105615 | 8/1980 |
| JP | 56-86790 | 7/1981 |
| JP | 59-46126 | 3/1984 |
| RO | 92076 | 7/1987 |
| WO | WO 95/34609 | 12/1995 |
| WO | WO 99/47252 | 9/1999 |
| WO | WO 01/30146 A1 | 5/2001 |
| WO | WO 2005/116559 A1 | 12/2005 |
| WO | WO 2006/092439 A1 | 9/2006 |

OTHER PUBLICATIONS

U.S. Appl. No. 12/444,051, filed Apr. 2, 2009, Jung, et al.
U.S. Appl. No. 12/517,360, filed Jun. 3, 2009, Jung, et al.
U.S. Appl. No. 12/918,728, filed Aug. 20, 2010, Jung, et al.

* cited by examiner

*Primary Examiner* — James J Seidleck
*Assistant Examiner* — S. Camilla Pourbohloul
(74) *Attorney, Agent, or Firm* — Oblon, Spivak, McClelland, Maier & Neustadt, L.L.P.

(57) ABSTRACT

The present invention concerns microcapsules comprising a capsule core and a capsule wall composed of thermoset polymer and also, disposed on the outer surface of the capsule wall, a polyelectrolyte having an average molecular weight in the range from 500 g/mol to 10 million g/mol, and also a process for their production and their use in bindered building materials, textiles, heat transfer fluids and dumped beds.

17 Claims, No Drawings

POLYELECTROLYTE-MODIFIED MICROCAPSULES

The present invention concerns microcapsules comprising a capsule core and a capsule wall composed of thermoset polymer and also, disposed on the outer surface of the capsule wall, a polyelectrolyte having an average molecular weight in the range from 500 g/mol to 10 million g/mol, and also a process for their production and their use in bindered building materials, textiles, heat transfer fluids and dumped beds.

Microcapsules are known in a wide variety of embodiments and are used for very different purposes according to capsule wall tightness. For example, they serve to protect core materials which are not to be released until the capsule wall has been mechanically destroyed in a specific manner, for example dyes for carbonless copy papers, or encapsulated scents. Capsule wall materials in such application areas are known to be based on gelatin, polyurethane resin, melamine-formaldehyde resin, or polyacrylate. Wall materials containing active crop-protecting or pharmaceutical ingredients as core materials have to meet other requirements in that the capsule wall has to be pervious to permit controlled release and target-directed delivery of active ingredients. Capsules here are known to be produced by mechanical-physical processes as well as chemical ones.

EP-A 1 064 087 teaches the production of microcapsules having pervious walls wherein an organic microsphere is enveloped with alternating layers of cationic and anionic polyelectrolytes and the microsphere is subsequently dissolved out to leave a cavity or void space.

The encapsulation of latent heat storage materials, also known as phase change materials (PCMs), is an utterly different application of microcapsules.

The functioning of PCMs rests on the transformation enthalpy which arises during the solid/liquid phase transition and which signifies an absorption of energy or release of energy to the environment. They can consequently be utilized to keep a temperature constant within a fixed temperature range. Since PCMs are present as liquids as well as solids, depending on the temperature, they cannot be processed directly with textiles or fibers, since separation from the fiber or fabric would have to be expected.

The production of microcapsules having walls based on polymethyl methacrylate is described in WO 2005/116559 for example. The microcapsules are produced by addition polymerization of an oil-in-water emulsion comprising monomers, lipophilic substance and a protective colloid. Such protective colloids, present during the polymerization, become co-incorporated into the capsule wall (in the case of Pickering systems) depending on their solubility, or remain dissolved in the aqueous phase.

EP-A 1 321 182 teaches microencapsulated latent heat storage materials comprising a capsule wall composed of a highly crosslinked methacrylic ester polymer and also specifies their use in textiles.

An important criterion for applications as a finish in the textile sector is durability to dry cleaning, i.e., resistance to chlorinated or perchlorinated solvents. Conventional microcapsules are often observed to lose weight due to insufficiently tight or defective capsules. Such washout losses can be in the range of 5-15% by weight.

Prior application PCT/EP 2006/060439 proposes by way of a solution to this problem to use a microcapsular powder composed of microcapsules based on highly crosslinked methacrylic esters and having a primary particle size of 0.5 to 30 µm and an average powder particle size of 150-400 µm. However, a finer microcapsular powder is desired for some applications.

It is an aspect of the present invention to provide microcapsules having latent heat storage materials as a capsule core and enhanced durability to dry cleaning. Microcapsules having a higher tightness to diffusion of the core material are a further aspect of the present invention.

We have accordingly found microcapsules comprising a capsule core and a capsule wall composed of thermoset polymer and also, disposed on the outer surface of the capsule wall, a polyelectrolyte having an average molecular weight in the range from 500 g/mol to 10 million g/mol.

The microcapsules of the present invention comprise a capsule core and a capsule wall composed of thermoset polymer. The capsule core consists predominantly, to more than 95% by weight, of lipophilic substance. The capsule core is solid or liquid depending on the temperature. Depending on the production process and the protective colloid chosen to carry it out, this protective colloid can likewise be part of the microcapsules. Thus, up to 3% by weight, based on the total weight of the microcapsules, can be protective colloid. In this embodiment, the microcapsules have the protective colloid on the surface of the thermoset polymer and the protective colloid forms the outer surface of the capsule wall. It is believed that, according to the present invention, the polyelectrolytes become disposed thereon.

The average particle size of the capsules (Z-average by light scattering) is in the range from 0.5 to 100 µm, preferably in the range from 1 to 80 µm and in particular in the range from 1 to 50 µm. The weight ratio of capsule core to thermoplastic polymer is generally in the range from 50:50 to 95:5. A core/wall ratio in the range from 70:30 to 93:7 is preferred.

According to the present invention, polyelectrolytes are disposed on the outer surface of the capsule wall. Depending on the amount of polyelectrolyte, the polyelectrolyte arrangement on the surface takes the form of points, spots or dots, or takes the form of regions which can extend to where the polyelectrolyte forms a uniform arrangement which resembles a layer, sheath, shell or envelope.

In general, the fraction of polyelectrolyte is in the range from 0.1% to 10% by weight based on the total weight of the polyelectrolyte-bearing microcapsules. Preferably the polyelectrolyte fraction is 0.5%-5% by weight and in particular 1%-3% by weight based on the total weight of the polyelectrolyte-bearing microcapsules.

Different wall thicknesses can be necessary depending on the field of use, so that it can further be sensible to orient the amount of polyelectrolyte on the basis of the total amount of monomers in the wall.

The preferred amount of polyelectrolyte in one embodiment is accordingly in the range from 10% to 30% by weight based on the total amount of the monomers in the wall material.

In another embodiment, the preferred amount of polyelectrolyte is in the range from 5% to 15% by weight based on the total amount of the monomers in the wall material.

The term polyelectrolyte generally refers to polymers having ionizable or ionically dissociable groups which can be a polymer chain constituent or substituent. Typically, the number of these ionizable or ionically dissociable groups in the polyelectrolyte is so large that the polymers are water soluble or swellable in their ionic form (also known as polyions). Preference is given to polyelectrolytes which have a solubility of $\geq 4$ g/l in water at 25° C., in particular polyelectrolytes having unlimited solubility or swellability in water. Preference is given to polyelectrolytes that bear an electrolyte functionality on each repeat unit.

Unlike protective colloids, polyelectrolytes generally have little if any emulsifying effect and have predominantly a thickening effect. In the realm of the present invention, polyelectrolytes have an average molecular weight in the range from 500 to 10 000 000 g/mol, preferably in the range from 1000 to 100 000 g/mol and in particular in the range from 1000 to 10 000 g/mol. Linear or branched polyelectrolytes can be used.

Unlike the protective colloids used in the realm of the present invention, which are added prior to the polymerization for producing the oil-in-water emulsion, polyelectrolytes in the realm of the present invention are polymers having ionizable or ionically dissociable groups which are contacted with the microcapsules—that is, after polymerization has taken place—in an aqueous medium, preferably water. Aqueous medium comprises aqueous mixtures comprising up to 10% by weight, based on the aqueous medium, of a water-miscible solvent which is miscible with water in the desired use quantity at 25° C. and 1 bar. This includes alcohols such as methanol, ethanol, propanol, isopropanol, glycol, glycerol and methoxyethanol and water-soluble ethers such as tetrahydrofuran and dioxane and also aprotic admixtures such as dimethylformamide or dimethyl sulfoxide.

Depending on the identity of the dissociable groups, there are cationic and anionic polyelectrolytes (also known as polyion). The charge on the polyion is considered, without counter-ion. Cationic polyelectrolytes are formed from polymers comprising basic groups (polybases) by addition of protons or quaternization.

Anionic polyelectrolytes are formed from polymers comprising acidic groups (polyacids) by detachment of protons.

The polyelectrolyte is classified according to the resulting net charge of the polyion (i.e., without counter-ion). When the polyelectrolyte has predominantly positively charged, dissociated groups, it is a cationic polyelectrolyte. When it has predominantly negatively charged groups, it is an anionic polyelectrolyte.

Preference is given to using one or more cationic or one or more anionic polyelectrolytes. Particular preference is given to choosing one or more cationic polyelectrolytes. It is believed that successive addition of a plurality of differently charged polyelectrolytes will lead to the construction of a plurality of layers, provided the amount of polyelectrolyte is in each case sufficient to construct a layer. In general, an amount of at least 1% by weight of polyelectrolyte based on the total weight of the polyelectrolyte-bearing microcapsules will lead to coating with a layer. Preferably, however, only one layer of polyelectrolyte is applied. This layer may comprise one polyelectrolyte or a mixture of a plurality of polyelectrolytes having the same charge.

Anionic polyelectrolytes are obtainable for example by free radical polymerization of ethylenically unsaturated anionic monomers in an aqueous medium. Useful ethylenically unsaturated anionic monomers include for example monoethylenically unsaturated $C_3$- to $C_5$-carboxylic acids such as acrylic acid, methacrylic acid, ethacrylic acid, crotonic acid, maleic acid, fumaric acid and itaconic acid, sulfonic acids such as vinylsulfonic acid, styrenesulfonic acid and acrylamidomethylpropanesulfonic acid and phosphonic acids such as vinylphosphonic acid, and/or the respective alkali metal, alkaline earth metal and/or ammonium salts thereof.

Preferred anionic monomers include acrylic acid, methacrylic acid, maleic acid and acrylamido-2-methylpropanesulfonic acid. Particular preference is given to aqueous dispersions of polymers based on acrylic acid. The anionic monomers can be polymerized either alone, to form homopolymers, or else in admixture with each other, to form copolymers. Examples thereof are the homopolymers of acrylic acid, homopolymers of methacrylic acid or copolymers of acrylic acid and maleic acid, copolymers of acrylic acid and methacrylic acid and also copolymers of methacrylic acid and maleic acid.

However, anionic monomers can also be polymerized in the presence of at least one other ethylenically unsaturated monomer. These monomers can be nonionic or alternatively bear a cationic charge.

Examples of nonionic comonomers are acrylamide, methacrylamide, N—$C_1$- to $C_3$-alkylacrylamides, N-vinylformamide, acrylic esters of monohydric alcohols having 1 to 20 carbon atoms such as in particular methyl acrylate, ethyl acrylate, isobutyl acrylate and n-butyl acrylate, methacrylic esters of monohydric alcohols having 1 to 20 carbon atoms for example methyl methacrylate and ethyl methacrylate, and also vinyl acetate and vinyl propionate.

Useful cationic monomers for copolymerization with anionic monomers include dialkylaminoethyl acrylates, dialkylaminoethyl methacrylates, dialkylaminopropyl acrylates, dialkylaminopropyl methacrylates, dialkylaminoethylacrylamides, dialkylaminoethylmethacrylamides, dialkylaminopropylacrylamides, dialkylaminopropylmethacrylamides, diallyldimethylammonium chloride, vinylimidazole, and also cationic monomers each neutralized and/or quaternized with mineral acids. Specific examples of cationic monomers are dimethylaminoethyl acrylate, dimethylaminoethyl methacrylate, diethylaminoethyl acrylate, diethylaminoethyl methacrylate, dimethylaminopropyl acrylate, dimethylaminopropyl methacrylate, diethylaminopropyl acrylate and diethylaminopropyl methacrylate, dimethylaminoethylacrylamide, dimethylaminoethylmethacrylamide, dimethylaminopropylacrylamide, dimethylaminopropylmethacrylamide, diethylaminoethylacrylamide and diethylaminopropylacrylamide.

Cationic monomers can be completely or else only partially neutralized or quaternized, for example to an extent in each case from 1% to 99%. Dimethyl sulfate is the preferred quaternizing agent for cationic monomers. However, the monomers can also be quaternized with diethyl sulfate or with alkylating agents, in particular alkyl halides such as methyl chloride, ethyl chloride or benzyl chloride. Comonomers for preparing anionic polyelectrolytes are used for example in such amounts that the resulting dispersions of polymer, on diluting with water and at above pH 7.0 and at 20° C., are water soluble and have an anionic charge. Based on total monomers used in the polymerization, the amount of nonionic and/or cationic comonomers is for example in the range from 0% to 99% by weight and preferably in the range from 5% to 75% by weight and is usually in the range from 5% to 25% by weight. Cationic monomers are used at most in an amount such that the resulting polyelectrolytes have a net anionic charge at pH<6.0 and 20° C. The excess anionic charge in the amphoteric polymers formed is for example at least 5 mol %, preferably at least 10 mol %, in particular at least 30 mol % and most preferably at least 50 mol %.

Examples of preferred copolymers are copolymers composed of 25% to 90% by weight acrylic acid and 75% to 10% by weight acrylamide. Preferably, at least one ethylenically unsaturated $C_3$ to $C_5$-carboxylic acid is polymerized in the absence of other monoethylenically unsaturated monomers. Particular preference is given to homopolymers of acrylic acid which are obtainable by free radical polymerization of acrylic acid in the absence of other monomers.

Useful crosslinkers for preparing branched polyelectrolytes include all compounds having at least two ethylenically unsaturated double bonds in the molecule. Such compounds are used for example in the preparation of crosslinked polyacrylic acids such as superabsorbent polymers, cf. EP-A 0 858 478 page 4 line 30 to page 5 line 43. Examples of crosslinkers are triallylamine, pentaerythritol triallyl ether, pentaerythritol tetraallyl ether, methylenebisacrylamide, N,N'-divinylethyleneurea, at least diallyl ethers or at least divinyl ethers of polyhydric alcohols such as for example sorbitol, 1,2-ethanediol, 1,4-butanediol, trimethylolpropane, glycerol, diethylene glycol, and of sugars such as sucrose, glucose, mannose, fully acrylated or methacrylated dihydric alcohols having 2 to 4 carbon atoms such as ethylene glycol dimethacrylate, ethylene glycol diacrylate, butanediol dimethacrylate, butanediol diacrylate, diacrylates or dimethacrylates of polyethylene glycols having molecular weights from 300 to 600, ethoxylated trimethylenepropane triacrylates or ethoxylated trimethylenepropane trimethacrylates, 2,2-bis(hydroxymethyl)butanol trimethacrylate, pentaerythritol triacrylate, pentaerythritol tetraacrylate and triallylmethylammonium chloride. When crosslinkers are used in the preparation of the dispersions of the present invention, the amounts of crosslinker which are used in each case are for example from 0.0005% to 5.0% by weight and preferably from 0.001% to 1.0% by weight, based on total monomers used in the polymerization. Preferred crosslinkers are pentaerythritol triallyl ether, pentaerythritol tetraallyl ether, N,N'-divinylethyleneurea, at least diallyl ethers of sugars such as sucrose, glucose or mannose and triallylamine, and also mixtures thereof.

Useful anionic polyelectrolytes further include polycondensates such as for example phenolsulfonic acid resins. Of suitability are aldehyde condensates, particularly on the basis of formaldehyde, acetaldehyde, isobutyraldehyde, propionaldehyde, glutaraldehyde and glyoxal, and very particularly formaldehyde condensates based on phenolsulfonic acids. Amines and amides, in particular those of carbonic acid such as for example urea, melamine or dicyandiamide are examples of further reacting compounds which can be co-used for preparing the phenolsulfonic acid resins.

The phenolsulfonic acid resins are preferably present as salts. The condensation products of the present invention preferably have a degree of condensation in the range from 1 to 20 and an average molecular weight of 500-10 000 g/mol. The phenolsulfonic acid resins are preferably prepared similarly to the way indicated in EP-A 816 406.

Useful cationic polyelectrolytes include for example polymers from the group of the
(a) polymers comprising vinylimidazolium units,
(b) polydiallyldimethylammonium halides,
(c) polymers comprising vinylamine units,
(d) polymers comprising ethyleneimine units,
(e) polymers comprising dialkylaminoalkyl acrylate and/or dialkylaminoalkyl methacrylate units, and
(f) polymers comprising dialkylaminoalkylacrylamide and/or dialkylaminoalkylmethacrylamide units.

Such polymers are known and commercially available. The monomers underlying the cationic polyelectrolytes of groups a-f can be used for polymerization in the form of the free base, but preferably in the form of their salts with mineral acids such as hydrochloric acid, sulfuric acid or phosphoric acid and also in quaternized form. Useful quaternizing agents include for example dimethyl sulfate, diethyl sulfate, methyl chloride, ethyl chloride, cetyl chloride or benzyl chloride.

Examples of cationic polyelectrolytes are
(a) homopolymers of vinylimidazolium methosulfate and/or copolymers of vinylimidazolium methosulfate and N-vinylpyrrolidone,
(b) polydiallyldimethylammonium chlorides,
(c) polyvinylamines and also partially hydrolyzed polyvinylformamides,
(d) polyethyleneimines
(e) polydimethylaminoethyl acrylate, polydimethylaminoethyl methacrylate, copolymers of acrylamide and dimethylaminoethyl acrylate and copolymers of acrylamide and dimethylaminoethyl methacrylate, for which the basic monomers can also be present in the form of the salts with mineral acids or in quaternized form, and
(f) polydimethylaminoethylacrylamide, polydimethylaminoethylmethacrylamide and copolymers of acrylamide and dimethylaminoethylacrylamide, for which the cationic monomers can also be present in the form of the salts with mineral acids or in quaternized form.

The average molar masses $M_w$ of the cationic polyelectrolytes are at least 500 g/mol. They are for example in the range from 500 g/mol to 10 million g/mol, preferably in the range from 1000 to 500 000 g/mol and usually in the range from 1000 to 5000 g/mol.

Preference for use as cationic polymers is given to
(a) homopolymers of vinylimidazolium methosulfate and/or copolymers of vinylimidazolium methosulfate and N-vinylpyrrolidone having an average molar mass $M_w$ of 500 to 10 000 g/mol in each case,
(b) polydiallyldimethylammonium chlorides having an average molar mass $M_w$ of 1000 to 10 000 g/mol,
(c) polyvinylamines and partially hydrolyzed polyvinylformamides having an average molar mass $M_w$ of 500 to 10 000 g/mol, and
(d) polyethyleneimines having an average molar mass $M_w$ of 500 to 10 000 g/mol. The copolymers of vinylimidazolium methosulfate and N-vinylpyrrolidone which are mentioned under (a) comprise, for example, from 10% to 90% by weight of N-vinylpyrrolidone incorporated in the form of polymerized units. Instead of N-vinylpyrrolidone, it is possible to use, as a comonomer, at least one compound from the group consisting of the ethylenically unsaturated $C_3$- to $C_5$-carboxylic acids, such as, in particular, acrylic acid or methacrylic acid, or the esters of these carboxylic acids with monohydric alcohols comprising 1 to 18 carbon atoms, such as methyl acrylate, ethyl acrylate, isopropyl acrylate, n-butyl acrylate, isobutyl acrylate, methyl methacrylate, ethyl methacrylate or n-butyl methacrylate.

A preferred polymer of group (b) is polydiallyldimethylammonium chloride. Also suitable are copolymers of diallyldimethylammonium chloride and dimethylaminoethyl acrylate, copolymers of diallyidimethylammonium chloride and dimethylaminoethyl methacrylate, copolymers of diallyldimethylammonium chloride and diethylaminoethyl acrylate, copolymers of diallyldimethylammonium chloride and dimethylaminopropyl acrylate, copolymers of diallyldimethylammonium chloride and dimethylaminoethylacrylamide and copolymers of diallyldimethylammonium chloride and dimethylaminopropylacrylamide. The copolymers of diallyidimethylammonium chloride comprise, for example, from 1 to 50, in general from 2 to 30, mol % of at least one of said comonomers incorporated in the form of polymerized units.

Polymers (c) comprising vinylamine units are obtainable by polymerization of N-vinylformamide, if appropriate in the presence of comonomers, and hydrolysis of the polyvinylformamides with elimination of formyl groups with formation of amino groups. The degree of hydrolysis of the polymers may be, for example, from 1% to 100% and is in general in the range from 60% to 100%. In the realm of the present application, partially hydrolyzed polyvinylformamides have a degree of hydrolysis of ≧50% and preferably of ≧90%. The preparation of homo- and copolymers of N-vinylformamide and the hydrolysis of these polymers with formation of polymers comprising vinylamine units are described in detail, for example, in U.S. Pat. No. 6,132,558, column 2, line 36 to column 5, line 25. The statements made there are hereby incorporated by reference in the disclosure of the present invention. Polymers comprising vinylamine units are sold, for example, as Catiofast® and Polymin® brands by BASF Aktiengesellschaft.

Polymers of group (d) which comprise ethyleneimine units, such as polyethyleneimines, are likewise commercial products. They are sold, for example, under the name Polymin® by BASF Aktiengesellschaft, e.g. Polymin® SK. These cationic polymers are polymers of ethyleneimine which are prepared by polymerization of ethyleneimine in an aqueous medium in the presence of small amounts of acids or acid-forming compounds, such as halogenated hydrocarbons, e.g. chloroform, carbon tetrachloride, tetrachloroethane or ethyl chloride, or are condensates of epichlorohydrin and compounds comprising amino groups, such as mono- and polyamines, e.g. dimethylamine, diethylamine, ethylenediamine, diethylenetriamine and triethylenetetramine, or ammonia. They have, for example, molar masses $M_w$ of from 500 to 1 million, preferably from 1000 to 500 000 g/mol.

This group of cationic polymers also includes graft polymers of ethyleneimine on compounds which have a primary or secondary amino group, e.g. polyamidoamines of dicarboxylic acids and polyamines. The polyamidoamines grafted with ethyleneimine can, if appropriate, also be reacted with bifunctional crosslinking agents, for example with epichlorohydrin or bischlorohydrin ethers of polyalkylene glycols.

Suitable cationic polymers of group (e) are polymers comprising dialkyleminoalkyl acrylate and/or dialkylaminoalkyl methacrylate units. These monomers can be used in the form of the free bases but are preferably used in the form of the salts with mineral acids, such as hydrochloric acid, sulfuric acid or phosphoric acid, and in quaternized form in the polymerization. Suitable quaternizing agents are, for example, dimethyl sulfate, diethyl sulfate, methyl chloride, ethyl chloride, cetyl chloride or benzyl chloride. Both homopolymers and copolymers can be prepared from these monomers. Suitable comonomers are, for example, acrylamide, methacrylamide, N-vinylformamide, N-vinylpyrrolidone, methyl acrylate, ethyl acrylate, methyl methacrylate and mixtures of said monomers.

Cationic polymers of group (f) are polymers which comprise dimethylaminoethylacrylamide or dimethylaminoethylmethacrylamide units and which comprise the cationic monomers preferably in the form of the salts with mineral acids or in quaternized form. These may be homopolymers and copolymers. Examples are homopolymers of dimethylaminoethylacrylamide which is completely quaternized with dimethyl sulfate or with benzyl chloride, homopolymers of dimethylaminoethylmethacrylamide which is completely quaternized with dimethyl sulfate, methyl chloride, ethyl chloride or benzyl chloride, and copolymers of acrylamide and dimethylaminoethylacrylamide quaternized with dimethyl sulfate.

In addition to those polycations which are composed solely of cationic monomers, amphoteric polymers may also be used as cationic polymers, provided that they carry a cationic charge overall. The cationic excess charge in the amphoteric polymers is, for example, at least 5 mol %, preferably at least 10 mol %, and is generally in the range from 15 to 95 mol %. Examples of amphoteric polymers having a cationic excess charge are copolymers of acrylamide, dimethylaminoethyl acrylate and acrylic acid which comprise at least 5 mol % more of dimethylaminoethyl acrylate than acrylic acid incorporated in the form of polymerized units, copolymers of vinylimidazolium methosulfate, N-vinylpyrrolidone and acrylic acid which comprise at least 5 mol % more of vinylimidazolium methosulfate than acrylic acid incorporated in the form of polymerized units, hydrolyzed copolymers of N-vinylformamide and of an ethylenically unsaturated $C_3$- to $C_5$-carboxylic acid, preferably acrylic acid or methacrylic acid, having a content of vinylamine units which is at least 5 mol % higher than units of ethylenically unsaturated carboxylic acids, copolymers of vinylimidazole, acrylamide and acrylic acid, the pH being chosen so that at least 5 mol % more vinylimidazole is cationically charged than acrylic acid is incorporated in the form of polymerized units.

Useful polyelectrolytes for the purposes of the present invention further include biopolymers, such as alginic acid, gum arabic, nucleic acids, pectins, proteins, and also chemically modified biopolymers, such as ionic or ionizable polysaccharides, examples being carboxymethylcellulose, chitosan, chitosan sulfate, and ligninsulfonate.

Preference is given to selecting the polyelectrolyte from the group comprising polyacrylic acids, phenolsulfonic acid precondensates, polydiallyldimethylammonium chlorides, polyvinylamines, partially hydrolyzed polyvinylformamides and polyethyleneimine.

One embodiment prefers anionic polyelectrolytes, in particular of polyacrylic acids and phenolsulfonic acid resins.

One embodiment prefers cationic polyelectrolytes, in particular of groups (b), (c) and (d), i.e., polydiallyldimethylammonium chlorides, polyvinylamines and partially hydrolyzed polyvinylformamides and polyethyleneimines. Particular preference is given to using polydiallyldimethylammonium chlorides as cationic polyelectrolyte.

It is believed that the polyelectrolytes accumulate on the electrostatically charged microcapsular wall owing to electrostatic interactions. However, it was observed that not just cationic polyelectrolytes lead to tighter microcapsular walls, but that the addition of anionic polyelectrolytes likewise increases the tightness of the capsular walls. It is believed that these interact with the microcapsular wall via hydrogen bonds or via counter-ions.

The microcapsules of the present invention are obtained by treating microcapsules with one or more polyelectrolytes. To this end, the microcapsules are contacted with one or more polyelectrolytes in an aqueous medium preferably water. In one embodiment, a microcapsular powder is dispersed in an aqueous medium or water and contacted with polyelectrolyte. In another embodiment, microcapsular powder is dispersed in an aqueous polyelectrolyte solution. The microcapsules are preferably obtained by free radical polymerization of an oil-in-water emulsion comprising the monomers, the lipophilic substance and a protective colloid and subsequent treatment with one or more polyelectrolytes and also if appropriate subsequent spray drying. The first step of free radical polymerization produces a starting microcapsular dispersion which is treated with the polyelectrolyte in the second step.

The polyelectrolyte is added to the starting microcapsular dispersion without a solvent or in solution, preferably as an aqueous solution. The amount of polyelectrolyte is in the range from 0.1% to 5% by weight, preferably in the range from 0.25% to 1.5% by weight, based on the starting microcapsular dispersion.

The capsular wall is of a thermoset polymer. Thermoset in this context refers to wall materials which, owing to their degree of crosslinking, do not soften, but decompose at high temperatures. Useful thermoset wall materials include for example crosslinked formaldehydic resins, crosslinked polyureas, crosslinked polyurethanes and also crosslinked methacrylic and acrylic ester polymers.

Formaldehydic resins are reaction products of formaldehyde with
    triazines such as melamine
    carbamides such as urea
    phenols such as phenol, m-cresol and resorcinol
    amino and amido compounds such as aniline, p-toluenesulfonamide, ethyleneurea and guanidine,
or mixtures thereof.

Formaldehydic resins preferred as capsular wall material are urea-formaldehyde resins, urea-resorcinol-formaldehyde resins, urea-melamine resins and melamine-formaldehyde resins. Of similar preference are the $C_1$-$C_4$-alkyl especially methyl ethers of these formaldehydic resins and also the mixtures of these formaldehydic resins. Preference is given in particular to melamine-formaldehyde resins and/or their methyl ethers.

The familiar carbonless copy paper processes utilize the resins as prepolymers. The prepolymer is still soluble in the aqueous phase and, in the course of the polycondensation, migrates to the interface and surrounds the oil droplets. Processes for microencapsulation using formaldehydic resins are common knowledge and are described for example in EP-A 562 344 and EP-A 974 394.

Capsule walls composed of polyureas and polyurethanes are likewise known from carbonless copy papers. The capsule walls are formed by reaction of $NH_2$— or $OH$— bearing reactants with di- and/or polyisocyanates. Useful isocyanates include for example ethylene diisocyanate, 1,4-tetramethylene diisocyanate, 1,6-hexamethylene diisocyanate and 2,4- and 2,6-tolylene diisocyanates. Polyisocyanates such as derivatives with biuret structure, polyuretonemines and isocyanurates may also be mentioned. Useful reactants include hydrazine, guanidine and its salts, hydroxylamine, di- and polyamines and amino alcohols. Such interfacial polyaddition processes are known for example from U.S. Pat. No. 4,021,595, EP-A 392 876 and EP-A 535 384.

Preference is given to microcapsules whose capsular wall is a polymer based on acrylic esters and/or methacrylic esters.

Such capsular walls are constructed of 10% to 100% by weight and preferably 30% to 99% by weight of one or more $C_1$-$C_{24}$-alkyl esters of acrylic and/or methacrylic acid as monomers 1. The polymers may also comprise up to 80% by weight, preferably 1% to 70% by weight, more preferably 5% to 60% by weight and especially 10% to 50% by weight of a bi- or polyfunctional monomer as monomers II, which is insoluble or sparingly soluble in water, in copolymerized form. In addition, the polymers may comprise up to 90% by weight, preferably 0.5% to 50% by weight and especially 1% to 30% by weight of other monomers III in copolymerized form.

Useful monomers I include $C_1$-$C_{24}$-alkyl esters of acrylic and/or methacrylic acid. Methyl acrylate, ethyl acrylate, n-propyl acrylate and n-butyl acrylate and/or the corresponding methacrylates are particularly preferred monomers 1. Preference is given to isopropyl acrylate, isobutyl acrylate, sec-butyl acrylate and tert-butyl acrylate and the corresponding methacrylates. Methacrylonitrile must also be mentioned. In general, the methacrylates are preferred.

Useful monomers II include bi- or polyfunctional monomers which are insoluble or sparingly soluble in water, but have good to limited solubility in the lipophilic substance. Sparing solubility is to be understood as meaning a solubility of less than 60 g/l at 20° C. Bi- or polyfunctional monomers are compounds having at least two nonconjugated ethylenic double bonds. Of primary interest are divinyl and polyvinyl monomers which effect crosslinking of the capsular wall during the polymerization.

Preferred bifunctional monomers are the diesters of diols with acrylic acid or methacrylic acid and also the diallyl and divinyl ethers of these diols.

Preferred divinyl monomers are ethanediol diacrylate, divinylbenzene, ethylene glycol dimethacrylate, 1,3-butylene glycol dimethacrylate, methallylmethacrylamide and allyl methacrylate. Particular preference is given to propanediol diacrylate, butanediol diacrylate, pentanediol diacrylate and hexanediol diacrylate or the corresponding methacrylates.

Preferred polyvinyl monomers are trimethylolpropane triacrylate and trimethacrylate, pentaerythritol triallyl ether and pentaerythritol tetraacrylate.

Useful monomers III include other monomers III such as vinyl acetate, vinyl propionate, vinylpyridine and styrene. Particular preference is given to monomers IIIa which bear charge or ionizable groups and differ from the monomers I and II, such as acrylic acid, methacrylic acid, itaconic acid, maleic acid, maleic anhydride, 2-hydroxyethyl acrylate, 2-hydroxyethyl methacrylate, acrylamido 2-methylpropanesulfonic acid, acrylonitrile, methacrylamide, N-vinylpyrrolidone, N-methylolacrylamide, N-methylolmeth-acrylamide, dimethylaminoethyl methacrylate and diethylaminoethylmethacrylate.

Particular preference is given to an embodiment wherein the capsular wall of the microcapsules is constructed from
    30% to 99% by weight of one or more $C_1$-$C_{24}$-alkyl esters of acrylic and/or methacrylic acid as monomers I
    1-70% by weight, preferably 5% to 60% by weight and especially 10% to 50% by weight of a bi- or polyfunctional monomer as monomers II, which is insoluble or sparingly soluble in water,
    0.5% to 50% by weight, preferably 1% to 30% by weight of other monomers IIIa, all based on the total weight of the monomers.

In a further preferred embodiment, the wall-forming polymers are formed from 30% to 90% by weight of methacrylic acid, 10% to 70% by weight of an alkyl ester of (meth)acrylic acid, preferably methyl methacrylate, tert-butyl methacrylate, phenyl methacrylate and cyclohexyl methacrylate, and 0% to 40% by weight of further ethylenically unsaturated monomers. These further ethylenically unsaturated monomers may be the monomers I, II and/or III not hitherto mentioned for this embodiment. Since they in general do not have any significant influence on the microcapsules of this embodiment, their fraction is preferably <20% by weight and especially <10% by weight. Such microcapsular dispersions and also their production are described in EP-A 1 251 954, expressly incorporated herein by reference.

The preferred microcapsular dispersions and also their production are known from EP-A 457 154, DE-A 101 39 171, DE-A 102 30 581 and EP-A 1 321 182, expressly incorporated herein by reference. Thus, the microcapsules are produced by preparing from the monomers, a free-radical initiator, a protective colloid and the lipophilic substance to be encapsulated a stable oil-in-water emulsion in which they are present as disperse phase. Polymerization of the monomers is then triggered by heating and controlled through a further temperature increase, the resulting polymers forming the capsule wall which surrounds the lipophilic substance.

Useful free-radical initiators for the free-radical polymerization reaction include the customary peroxo and azo compounds, advantageously in amounts from 0.2% to 5% by weight, based on the weight of the monomers.

Depending on the physical state of the free-radical initiator and its solubility characteristics, the free-radical initiator can be added as such, but it is preferably added as a solution, emulsion (liquid in liquid) or suspension (solid in liquid), which makes it possible to improve the precision of metering of small amounts of free-radical initiator in particular.

Preferred free-radical initiators are tert-butyl peroxyneodecanoate, tert-amyl peroxypivalate, dilauroyl peroxide, tert-amyl peroxy-2-ethylhexanoate, 2,2'-azobis(2,4-dimethyl) valeronitrile, 2,2'-azobis(2-methylbutyronitrile), dibenzoyl peroxide, tert-butyl per-2-ethylhexanoate, di-tert-butyl peroxide, tert-butyl hydroperoxide, 2,5-dimethyl-2,5-di(tert-butylperoxy)hexane and cumene hydroperoxide.

Particularly preferred free-radical initiators are di(3,5,5-trimethylhexanoyl) peroxide, 4,4'-azobisisobutyronitrile, tert-butyl perpivalate and dimethyl 2,2-azobisisobutyrate. These have a half life of 10 hours in a temperature range from 30 to 1 OOOC.

The temperature at which the polymerization is carried out is generally in the range from 20 to 100° C. and preferably in the range from 40 to 95° C. Depending on the desired lipophilic substance, the oil-in-water emulsion is to be formed at a temperature at which the core material is liquid/oily. Accordingly, the free-radical initiator chosen has to have its disintegration temperature above this temperature and the polymerization likewise has to be carried out at from 2 to 50° C. above this temperature, so that free-radical initiators whose disintegration temperature is above the melting point of the lipophilic substance are chosen, if appropriate.

A common process variant for lipophilic substances having a melting point of up to about 60° C. is a reaction temperature starting at 60° C., which is raised to 85° C. in the course of the reaction. Advantageous free-radical initiators have a 10 hour half life in the range from 45 to 65° C. such as t-butyl perpivalate.

In a further process variant for lipophilic substances having a melting point above 60° C., a temperature program which starts at correspondingly higher reaction temperatures is chosen. Free-radical initiators having a 10 hour half life in the range from 70 to 90° C. are preferred for initial temperatures of around 85° C. such as t-butyl per-2-ethylhexanoate.

The polymerization is conveniently carried out at atmospheric pressure, but can also be carried out at reduced or slightly elevated pressure, for example at a polymerization temperature above 100° C., i.e., in the range from 0.5 to 5 bar, say.

The reaction times for the polymerization are normally in the range from 1 to 10 hours and usually in the range from 2 to 5 hours.

Microcapsules are preferably formed by stepwise heating of the oil-in-water emulsion. Stepwise in this context is to be understood as meaning that the reaction is induced through disintegration of the free-radical initiator by raising the temperature and the polymerization is controlled by continued heating, which can take place continuously or periodically. The rate of polymerization can be controlled through choice of the temperature and the amount of free-radical initiator. This is preferably accomplished by means of a program featuring a rising temperature. The entire polymerization time may be subdivided into two or more periods for this purpose.

The first polymerization period is characterized by slow disintegration of the polymerization initiator. The temperature of the reaction mixture is increased in the second polymerization period and, if appropriate, further polymerization periods to hasten the disintegration of the polymerization initiators. The temperature can be raised in one step or in more than one step or continuously in a linear or nonlinear manner. The temperature difference between the start and the end of the polymerization can be up to 50° C. This difference is generally in the range from 3 to 40° C. and preferably in the range from 3 to 30° C.

After the end temperature has been reached, the polymerization is conveniently continued for about a period of up to 2 hours in order to reduce residual monomer contents. After the actual polymerization reaction at a conversion of 90% to 99% by weight, it is generally advantageous to render the aqueous microcapsular dispersions largely free of odor carriers, such as residual monomers and other organic volatile constituents. This can be achieved in a manner known per se by physical means by distillative removal (in particular by means of steam distillation) or by stripping with an inert gas. It may also be carried out by chemical means, as described in WO 9924525, advantageously by redox-initiated polymerization, as described in DE-A-4 435 423, DE-A-4419518 and DE-A-4435422.

In this way it is possible to produce a microcapsular dispersion comprising microcapsules with an average particle size in the range from 0.5 to 30 µm, it being possible to adjust the particle size in a manner known per se via the shear force, the stirring speed, the protective colloid and its concentration.

Preferred protective colloids are water-soluble polymers since these reduce the surface tension of the water from 73 mN/m maximum to 45 to 70 mN/m and thus ensure the formation of sealed capsule walls, and form microcapsules having average particle sizes in the range from 0.5 to 30 µm and preferably from 2 to 12 µm.

In general, the microcapsules are produced in the presence of at least one organic protective colloid, which may be either anionic or neutral. Anionic and nonionic protective colloids may also be used together. Preference is given to using inorganic protective colloids if appropriate in the mixture with organic protective colloids or nonionic protective colloids.

Organically neutral protective colloids are preferred in a further embodiment.

Organic neutral protective colloids are cellulose derivatives, such as hydroxyethylcellulose, methylhydroxyethylcellulose, methylcellulose and carboxymethylcellulose, polyvinylpyrrolidone, copolymers of vinylpyrrolidone, gelatin, gum arabic, xanthan, sodium alginate, casein, polyethylene glycols, preferably polyvinyl alcohol and partially hydrolyzed polyvinyl acetates and methylhydroxypropylcellulose.

Suitable anionic protective colloids are polymethacrylic acid, the copolymers of sulfoethyl acrylate and methacrylate, sulfopropyl acrylate and methacrylate, N-(sulfoethyl)maleimide, 2-acrylamido-2-alkylsulfonic acids, styrenesulfonic acid and vinylsulfonic acid.

Preferred anionic protective colloids are naphthalenesulfonic acid and naphthalenesulfonic acid-formaldehyde condensates and in particular polyacrylic acids and phenolsulfonic acid-formaldehyde condensates.

The anionic and nonionic protective colloids are generally used in amounts of from 0.1% to 10% by weight, based on the water phase of the emulsion.

Preference is given to inorganic protective colloids, so-called Pickering systems, which enable stabilization through very fine solid particles and are insoluble but dispersible in water or are insoluble and nondispersible in water, but wettable by the lipophilic substance.

Their mode of action and use is described in EP-A-1 029 018 and EP-A-1 321 182, both expressly incorporated by reference.

A Pickering system can here consist of the solid particles on their own or additionally of auxiliaries which improve the dispersibility of the particles in water or the wettability of the particles by the lipophilic phase.

The inorganic solid particles may be metal salts, such as salts, oxides and hydroxides of calcium, magnesium, iron, zinc, nickel, titanium, aluminum, silicon, barium and manganese. Examples are magnesium hydroxide, magnesium carbonate, magnesium oxide, calcium oxalate, calcium carbonate, barium carbonate, barium sulfate, titanium dioxide, aluminum oxide, aluminum hydroxide and zinc sulfide. Silicates, bentonite, hydroxyapatite and hydrotalcites may likewise be mentioned. Particular preference is given to finely divided silicas, magnesium pyrophosphate and tricalcium phosphate.

The Pickering systems may be added either firstly to the water phase, or be added to the stirred emulsion of oil-in-water. Some fine solid particles are prepared by a precipitation as described in EP-A 1 029 018, and EP-A 1 321 182.

The finely divided silicas may be dispersed as fine solid particles in water. It is, however, also possible to use so-called colloidal dispersions of silica in water. The colloidal dispersions are alkaline, aqueous mixtures of silica. In the alkaline pH range, the particles are swollen and are stable in water. For a use of these dispersions as Pickering system, it is advantageous if the pH of the oil-in-water emulsion is adjusted to pH 2 to 7 with an acid.

The inorganic protective colloids are generally used in amounts of from 0.5% to 15% by weight, based on the water phase.

In general, the organic neutral protective colloids are used in amounts of from 0.1% to 15% by weight, preferably from 0.5% to 10% by weight, based on the water phase.

Preferably, the dispersion conditions for preparing the stable oil-in-water emulsion are chosen in a manner known per se such that the oil droplets have the size of the desired microcapsules.

If appropriate, spraying assistants are added at the spray-drying stage to facilitate the spray-drying operation or achieve certain powder properties, for example low dust, flowability or improved redispersibility. A multiplicity of spraying assistants will be familiar to those skilled in the art. Examples of spraying assistants are to be found in DE-A 19629525, DE-A 19629526, DE-A 2214410, DE-A 2445813, EP-A 407889 or EP-A 784449. Advantageous spraying assistants are for example water-soluble polymers of the polyvinyl alcohol type or partially hydrolyzed polyvinyl acetates, cellulose derivatives, such as hydroxyethylcellulose, carboxymethylcellulose, methylcellulose, methylhydroxyethylcellulose and methylhydroxypropylcellulose, polyvinylpyrrolidone, copolymers of vinylpyrrolidone, gelatin, preferably polyvinyl alcohol and partially hydrolyzed polyvinyl acetates and methylhydroxypropylcellulose.

The microcapsular dispersion is preferably produced using organically neutral protective colloids, since there is no need to add spraying assistants to the spray-drying stage in this case. The organically neutral protective colloids also act as a spraying assistant, so that their use is particularly advantageous.

The microcapsules of the present invention are useful depending on the lipophilic substance for carbonless copy paper, in cosmetics, for encapsulating perfume chemicals, aroma chemicals or adhesive or in crop protection. The microcapsules of the present invention are particularly useful for latent heat storage materials.

Latent heat storage materials are by definition substances having a phase transition in the temperature range in which heat transfer is to take place. Preferably, the lipophilic substance has a solid/liquid phase transition in the temperature range from −20 to 120° C.

Examples of suitable substances are:
aliphatic hydrocarbyl compounds such as saturated or unsaturated $C_{10}$-$C_{40}$ hydrocarbons, which are branched or preferably linear, e.g. such as n-tetradecane, n-pentadecane, n-hexadecane, n-heptadecane, n-octadecane, n-nonadecane, n-eicosane, n-heneicosane, n-docosane, n-tricosane, n-tetracosane, n-pentacosane, n-hexacosane, n-heptacosane, n-octacosane and cyclic hydrocarbons, e.g. cyclohexane, cyclooctane, cyclodecane;
aromatic hydrocarbyl compounds, such as benzene, naphthalene, biphenyl, o- or n-terphenyl, $C_1$-$C_4$alkyl-substituted aromatic hydrocarbons, such as dodecylbenzene, tetradecylbenzene, hexadecylbenzene, hexylnaphthalene or decylnaphthalene;
saturated or unsaturated $C_1$-$C_{30}$-fatty acids, such as lauric, stearic, oleic or behenic acid, preferably eutectic mixtures of decanoic acid with e.g. myristic, palmitic or lauric acid;
fatty alcohols, such as lauryl, stearyl, oleyl, myristyl, cetyl alcohol, mixtures such as coconut fatty alcohol, and the so-called oxo alcohols which are obtained by hydroformylation of α-olefins and further reactions;
$C_6$-$C_{30}$-fatty amines, such as decylamine, dodecylamine, tetradecylamine or hexadecylamine;
esters such as $C_1$-$C_{10}$-alkyl esters of fatty acids, such as propyl palmitate, methyl stearate or methyl palmitate, and preferably their eutectic mixtures or methyl cinnamate;
natural and synthetic waxes, such as montan acid waxes, montan ester waxes, carnauba wax, polyethylene wax, oxidized waxes, polyvinyl ether wax, ethylene vinyl acetate wax or hard waxes in accordance with Fischer-Tropsch processes;
halogenated hydrocarbons, such as chloroparaffin, bromoctadecane, bromopentadecane, bromononadecane, bromoeicosane, bromodocosane.

Mixtures of these substances are also suitable provided the melting point is not lowered outside of the desired range, or the heat of fusion of the mixture is too low for sensible application.

For example, the use of pure n-alkanes, n-alkanes with a purity greater than 80% or of alkane mixtures as are produced as technical-grade distillate and as such are commercially available is advantageous.

In addition, it may be advantageous to add to capsule core-forming substances compounds which are soluble therein in order to prevent the lowering of the freezing point which sometimes arises with nonpolar substances. As described in U.S. Pat. No. 5,456,852 it is advantageous to use compounds with a melting point at from 20 to 120 K higher than the actual core substance. Suitable compounds are the fatty acids, fatty alcohols, fatty amides and aliphatic hydrocarbyl compounds mentioned above as lipophilic substances. They are added in amounts of from 0.1% to 10% by weight, based on the capsule core.

The latent heat storage materials are chosen according to the temperature range in which the heat storage media are desired. For example, for heat storage media in building materials in a moderate climate, preference is given to using latent heat storage materials whose solid/liquid phase transition is in the temperature range from 0 to 60° C. Thus, for interior applications, individual materials or mixtures with conversion temperatures of from 15 to 30° C. are usually chosen. In the case of solar applications as storage medium or avoiding the overheating of transparent thermal insulation, as described in EP-A-333 145, conversion temperatures of 30-60° C. are especially suitable.

Preferred latent heat storage materials are aliphatic hydrocarbons, particularly preferably those listed above by way of example. Particular preference is given to aliphatic hydrocarbons having 14 to 20 carbon atoms, and mixtures thereof.

The microcapsular powder of the present invention has diverse uses. It is very useful for modifying fibers and textile articles of manufacture, for example textile wovens and nonwovens (batts for example). Useful application forms here include in particular microcapsular coatings, foams with microcapsules and microcapsule-modified textile fibers. For coatings, the microcapsules are applied to a textile article of manufacture together with a polymeric binder and if appropriate other auxiliary materials, generally as a dispersion. Customary textile binders are film-forming polymers having a glass transition temperature in the range from −45 to 45° C. preferably −30 to 12° C. The production of such microcapsular coatings is described for example in WO 95/34609, expressly incorporated by reference. The modification of foams with microcapsules is effected in a similar manner as described in DE 981576T and U.S. Pat. No. 5,955,188. The prefoamed substrate, preferably a polyurethane or polyether, is surface treated with a binder-containing microcapsular dispersion. The binder-microcapsule mixture is subsequently brought, by application of reduced pressure, into the open-cell foam structure in which the binder cures and binds the microcapsules to the substrate. A further processing possibility is to modify the textile fibers themselves, by spinning from a melt or an aqueous dispersion as described in US 2002/0054964. Melt spinning processes are employed for nylon fibers, polyester fibers, polypropylene fibers and similar fibers, whereas the wet spinning process is utilized for the production of acrylic fibers in particular.

The microcapsular powder of the present invention possesses good durability to dry cleaning.

A further broad field of application is that of bindered building materials comprising mineral, silicatic or polymeric binders. A distinction is made between shaped articles and coating compositions. They are notable for their hydrolytic stability to the aqueous and often alkaline aqueous materials.

The term mineral shaped article refers to a shaped article formed, after shaping, from a mixture of a mineral binder, water, aggregates and also, if appropriate, auxiliaries by the hardening of the mineral binder/water mixture as a function of time, with or without the action of elevated temperature. Mineral binders are common knowledge. They comprise finely divided inorganic substances such as lime, gypsum, clay, loam and/or cement, which are converted to their ready-to-use form by pasting with water and in this form, when left to themselves, undergo consolidation as a function of time to a stonelike mass in air or even under water, with or without the action of elevated temperature.

The aggregates consist in general of granular or fibrous natural or synthetic rock (gravel, sand, glass fibers or mineral fibers) or else, in special cases, of metals or organic aggregates or of mixtures thereof, having grain sizes or fiber lengths in each case adapted to the intended application in a conventional manner. In many cases, chromatic pigments are also used as aggregates for coloring purposes.

Useful auxiliaries include in particular those substances which hasten or delay hardening or which influence the elasticity or porosity of the consolidated mineral shaped article. In particular, they are polymers known for example from U.S. Pat. No. 4,340,510, GB-PS 15 05 558, U.S. Pat. No. 3,196,122, U.S. Pat. No. 3,043,790, U.S. Pat. No. 3,239,479, DE-A 43 17 035, DE-A 43 17 036, JP-A 91/131 533 and other references.

The microcapsules of the present invention are suitable for modifying mineral bindered building materials (mortarlike preparations) comprising a mineral binder which consists of from 70% to 100% by weight cement and 0% to 30% by weight gypsum. This holds in particular when cement is the sole mineral binder. The effect of the present invention is essentially independent of the type of cement. Depending on the product at hand, therefore, it is possible to use blast furnace cement, oil shale cement, Portland cement, hydrophobicized Portland cement, quick-sefting cement, high-expansion cement or high-alumina cement, the use of Portland cement proving to be particularly favorable. For further details reference may be made to DE-A 19 623 413. Typically, the dry compositions of mineral bindered building materials comprise from 0.1% to 20% by weight of microcapsules, based on the amount of mineral binder.

The microcapsules of the present invention are preferably employed in mineral coating compositions such as render. A render of this kind for the interior sector is typically composed of gypsum binder. The weight ratio of gypsum/microcapsule is generally in the range from 95:5 to 70:30. Higher microcapsular fractions are possible of course.

Coatings for the exterior sector such as exterior facings or moist environments may comprise cement (cementiceous renders), lime or waterglass (mineral or silicate renders) or polymeric dispersions (synthetic-resin renders) as a binder together with fillers and, if appropriate, pigments for coloration. The fraction of total solids accounted for by the microcapsules corresponds to the weight ratios for gypsum renders.

The microcapsules of the present invention are further useful in polymeric shaped articles or polymeric coating compositions. By these are meant thermoplastic and thermoset plastics materials whose processing does not entail destruction of the microcapsules. Examples are epoxy, urea, melamine, polyurethane and silicone resins and also coating materials—solventbornes, high solids, powder coatings or waterbornes—and dispersion films. The microcapsular powder is also suitable for incorporation in polymeric foams and fibers. Examples of foams are polyurethane foam, polystyrene foam, latex foam and melamine resin foam.

The microcapsules of the present invention are further useful in lignocellulosic shaped articles such as chipboard.

Advantageous effects can further be achieved if the microcapsules of the present invention are processed in mineral shaped articles which are subjected to foaming.

The microcapsules of the present invention are further useful for modifying gypsum plasterboard. Microcapsular powder is incorporated in an amount which is preferably in the range from 5% to 40% by weight and in particular in the range from 20% to 35% by weight based on the total weight of the gypsum plasterboard (dry matter). The production of gypsum plasterboard comprising microencapsulated latent heat storage media is common knowledge and described in WO-A 1421243, incorporated herein by reference. Instead of cellulose-based card it is also possible to use alternative, fibrous structures as bothsided covers for the "gypsum plasterboard". Alternative materials are polymeric fibers composed for example of polypropylene, polyester, polyamide, polyacrylates, polyacrylonitrile and the like. Glass fibers are suitable as well. The alternative materials can be employed as wovens and as nonwovens. Such building boards are known for example from U.S. Pat. Nos. 4,810,569, 4,195,110 and 4,394,411.

The microcapsules of the present invention are further useful for producing heat transfer fluid. Heat transfer fluid herein refers not only to fluids for heat transport but also to fluids for cold transport, i.e., cooling fluids. The principle of the transfer of thermal energy is the same in the two cases and only differs in the direction of transfer.

The microcapsules of the present invention are also suitable for dumped beds.

The examples which follow illustrate the invention. The percentages in the examples are by weight.

The particle size of the microcapsular powder was determined using a 3600E Malvern Particle Sizer in accordance with a standard method of measurement which is documented in the literature.

Method of determining the durability of wax capsules to dry cleaning 5 g of microcapsular powder were stirred with 45 g of tetrachloroethylene with a magnetic stirrer at room temperature for 2 hours and then the powder was separated off via a fluted filter. The stirring with tetrachloroethylene dissolved escaped wax, but not the capsular wall. Subsequently, the weight of the solution in a metal dish and the residue after the solvent had been evaporated were determined. The amount of residue based on the initial weight of microcapsular powder is equal to the washout loss.

Determination of Evaporation Rate

By way of pretreatment, 2 g of the microcapsular dispersion were dried in an aluminum dish at 105° C. for two hours to remove any residual water. Then, the weight ($m_o$) was determined. After one hour of heating at 180° C. and cooling, the weight is redetermined ($m_1$). The weight difference ($m_0 - m_1$) based on $m_0$ indicates the evaporation rate.

Production of Microcapsular Dispersion

EXAMPLE 1

Aqueous Phase
1304 kg of water
664 kg of hydroxypropylcellulose (5% in water)
166 kg of polyvinyl alcohol (degree of hydrolysis: 79%)
7.3 kg of sodium nitrite
Oily Phase
1507 kg of octadecane
31.5 kg of paraffin wax (melting point: 68-70° C.)
34 kg of methacrylic acid (20% by weight, based on total monomer)
68.5 kg of methyl methacrylate (40% by weight)
68.5 kg of butanediol acrylate (40% by weight)
2.45 kg of t-butyl perpivalate
Feed Stream 1
18.79 kg of t-butyl hydroperoxide, 10% in water
Feed stream 2
1.05 kg of ascorbic acid, 15 kg of sodium hydroxide (25% in water), 100 kg of water
Feed stream 3
190 kg of polyacrylic acid ($M_w$=1200 g/mol, 45% solution in water)

The above aqueous phase was introduced as initial charge at room temperature and adjusted to pH 4 with 10% nitric acid. The oily phase was added and the mixture dispersed with a high-speed dissolver at 4200 rpm. After 40 minutes of dispersing a stable emulsion of particle size 2 to 12 µm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling and addition of the polyelectrolytes (feed stream 3) at a metered rate with stirring. The microcapsular dispersion formed had a solids content of 44% and an average particle size D(4,3)=8.2 µm (measured using Fraunhofer diffraction, volume average). The ratio of capsular wall to core material (paraffin) is 10:90. Example 1 corresponds to comparative experiment V5 (without feed stream 3) or 6 (see table).

EXAMPLE 2

Aqueous Phase
330 kg of water
180 kg of polyvinyl alcohol (degree of hydrolysis: 80%)
1.8 kg of sodium nitrite (2.5% in water)
Oily Phase
440 kg of n-tetradecane
9 kg of paraffin wax (melting point: 68-70° C.)
15 kg of methacrylic acid
77 kg of methyl methacrylate
28 kg of butanediol acrylate
1.35 kg of t-butyl perpivalate
Feed Stream 1
1.09 kg of t-butyl hydroperoxide, 70% in water
Feed Stream 2
0.34 kg of ascorbic acid, 56 kg of water
Feed Stream 3
34.2 kg of polydiallyldimethylammonium chloride ($M_w$=400 000 g/mol 30% aqueous solution)

The Above Aqueous Phase was Introduced as Initial Charge at Room Temperature. The oily phase was added and the mixture dispersed with a high-speed dissolver at 4500 rpm at 40° C. After 40 minutes of dispersing a stable emulsion of particle size from 2 to 12 µm in diameter was obtained. The emulsion was heated from 40° C. to 70° C. over 60 minutes, from 70° C. to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 100 minutes with stirring at 70° C. This was followed by cooling and addition of the polyelectrolyte (feed stream 3) at a metered rate. The microcapsular dispersion formed had a solids content of 48.0% and an average particle size 4.7 µm (measured using Fraunhofer diffraction, volume average).

EXAMPLE 3

Aqueous Phase
1304 kg of water
670 kg of hydroxyethylcellulose (5% in water)
180 kg of polyvinyl alcohol (degree of hydrolysis: 79%)
7.9 kg of sodium nitrite
Oily Phase
1504 kg of n-octadecan
68.5 kg of methyl methacrylate
54.8 kg of butanediol acrylate
13.7 kg of dimethylaminoethyl methacrylate
2.45 kg of t-butyl perpivalate Feed Stream 1
18.79 kg of t-butyl hydroperoxide, 10% in water
Feed Stream 2
1.05 kg of ascorbic acid, 15 kg of caustic soda (25% in water), 100 kg of water
Feed Stream 3
98.4 kg of phenolsulfonic acid-formaldehyde resin (50% aqueous solution, $M_w$=7000 g/mol)

The above aqueous phase was introduced as initial charge at room temperature. The oily phase was added and the mixture dispersed with a high-speed dissolver at 3800 rpm. After 40 minutes of dispersing a stable emulsion of particle size from 2 to 12 μm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling and addition of the polyelectrolyte (feed stream 3). The microcapsular dispersion formed had a solids content of 42% and an average particle size 5.8 μm (measured using Fraunhofer diffraction, volume average).

EXAMPLE 4

Aqueous Phase
1606.7 kg of water
825.5 kg of hydroxyethylcellulose (5% in water)
221.8 kg of polyvinyl alcohol (degree of hydrolysis: 79%)
9.7 kg of sodium nitrite
Oily Phase
1027.4 kg of n-octadecane
34.3 kg of methyl methacrylate
11.4 kg of butanediol acrylate
68.5 kg of methacrylic acid
2.45 kg of t-butyl perpivalate Feed Stream 1:
18.79 kg of t-butyl hydroperoxide, 10% in water
Feed Stream 2:
1.05 kg of ascorbic acid, 15 kg of sodium hydroxide (25% in water), 100 kg of water
Feed Stream 3:
98.4 kg of phenolsulfonic acid-formaldehyde resin (50% aqueous solution, $M_w$=7000 g/mol)

The above aqueous phase was introduced as initial charge at room temperature. The oily phase was added and the mixture dispersed with a high-speed dissolver at 3800 rpm. After 40 minutes of dispersing a stable emulsion of particle size from 2 to 12 μm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added.

Feed stream 2 was added at a metered rate over 80 minutes with stirring at 70° C. This was followed by cooling and addition of the polyelectrolyte (feed stream 3). The microcapsular dispersion formed had a solids content of 30.1% and an average particle size 9.8 μm (measured using Fraunhofer diffraction, volume average).

EXAMPLES 5-15

Inventive microcapsules were produced from the monomers and polyelectrolytes reported in the table, similarly to example 1. Examples V5, V7, V9, V11 and V14 identify the samples before modification with polyelectrolytes. The polyelectrolyte-modified microcapsules are the examples 6, 8, 10, 12, 13 and 15. Evaporation rate and washout loss are reported in the table.

The results illustrate that inventive microcapsules provide distinctly better values with regard to tightness and durability to cleaning.

| Ex. | Total monomer [wt. %] | MMA [wt. %] | MA [wt. %] | BDA-2 [wt. %] | DMAEMA [wt. %] | Solids content [wt. %] | Polyelectrolyte [wt. %] | Evaporation rate [%] | Washout loss [%] |
|---|---|---|---|---|---|---|---|---|---|
| V5 | 10 | 40 | 20 | 40 | 0 | — | — | 7.3 | — |
| 6 | 10 | 40 | 20 | 40 | 0 | 44 | 5% of polyacrylic acid | 2.9 | — |
| V7 | 15 | 70 | 5 | 25 | 0 | — | — | 9.1 | 6.4 |
| 8 | 15 | 70 | 5 | 25 | 0 | 45 | 3% of phenolsulfonic acid-formaldehyde resin | 4.1 | 4.1 |
| V9 | 10 | 50 | 0 | 40 | 10 | — | — | 5.6 | — |
| 10 | 10 | 50 | 0 | 40 | 10 | 45 | 3% of phenolsulfonic acid-formaldehyde resin | 3.3 | — |
| V11 | 15 | 65 | 10 | 25 | 0 | — | — | 6.9 | — |
| 12 | 15 | 65 | 10 | 25 | 0 | | 1% of phenolsulfonic acid-formaldehyde resin | 1.1 | — |
| 13 | 15 | 65 | 10 | 25 | 0 | 43 | 3% of polydiallyldimethyl-ammonium chloride | 1.7 | — |
| V14 | 10 | 30 | 60 | 10 | 0 | — | — | 3.4 | — |
| 15 | 10 | 30 | 60 | 10 | 0 | 30 | 1% of phenolsulfonic acid-formaldehyde resin | 3.1 | — |

MMA: methyl methacrylate; MA: methacrylic acid; BDA-2: 2-butanediol acrylate; DMAEMA: dimethylaminoethyl methacrylate;

Monomer amounts are based on total monomer

Total monomer in % by weight is based on the microcapsule. Total monomer is a measure of wall thickness.

EXAMPLE B1

Aqueous Phase
1304 kg of water
664 kg of a 5% by weight aqueous hydroxypropylcellulose solution
166 kg of a 10% by weight aqueous polyvinyl alcohol solution (degree of hydrolysis: 79%) Mowiol® 15-79
7.3 kg of a 2.5% by weight aqueous sodium nitrite solution
Oily Phase
1507 kg of octadecane
31.5 kg of paraffin wax (melting point: 68-70° C.)
34 kg of methacrylic acid (20% by weight, based on total monomer)
68.5 kg of methyl methacrylate (40% by weight)
68.5 kg of butanediol acrylate (40% by weight)
2.45 kg of a 75% by weight solution of t-butyl perpivalate in aliphatic hydrocarbons
Feed Stream 1:
18.79 kg of a 10% by weight aqueous solution of t-butyl hydroperoxide
Feed Stream 2:
98.5 kg of a 1% by weight aqueous solution of ascorbic acid
Feed Stream 3
15 kg of 25% by weight aqueous sodium hydroxide solution
105 kg of water
Feed Stream 4:
17.53 kg of a 30% solution of Viscalex® HV 30 in water
Feed Stream 5:
190 kg of 45% by weight aqueous polyacrylic acid solution ($M_w$=1200 g/mol)

The above aqueous phase was introduced as initial charge at room temperature and adjusted to pH 4 with 10% nitric acid. The oily phase was added and the mixture dispersed with a high-speed dissolver at 4200 rpm. After 40 minutes of dispersing a stable emulsion of particle size 2 to 12 μm in diameter was obtained. The emulsion was heated to 56° C. over 40 minutes, to 70° C. in the course of a further 20 minutes and to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 80 minutes with stirring at 70° C. This was followed by cooling, addition of feed streams 3 and 4, and addition of the polyelectrolytes (feed stream 5) at a metered rate with stirring. The microcapsular dispersion formed had a solids content of 44% and an average particle size D(4,3)=8.2 μm (measured using Fraunhofer diffraction, volume average). The ratio of capsular wall to core material (paraffin) is 10:90. Example B1 corresponds to comparative experiment VB5 (without feed stream 3) or B6 (see table).

EXAMPLE B2

Aqueous Phase
387.8 kg of water
193.9 kg of a 10% by weight aqueous polyvinyl alcohol solution (degree of hydrolysis: 80%)
2.14 kg of a 2.5% by weight aqueous sodium nitrite solution
Oily Phase
440 kg of n-tetradecane
9.2 kg of paraffin wax (melting point: 68-70° C.)
7.9 kg of methacrylic acid
51.5 kg of methyl methacrylate
19.8 kg of butanediol acrylate
0.8 kg of ethylhexyl thioglycolate
0.71 kg of a 75% by weight solution of t-butyl perpivalate in aliphatic hydrocarbons
Feed Stream 1:
5.5 kg of a 10% by weight aqueous t-butyl hydroperoxide solution
Feed Stream 2:
28.9 kg of a 1% by weight aqueous ascorbic acid solution
Feed Stream 3:
34.2 kg of a 30% by weight aqueous polydiallyldimethylammonium chloride solution ($M_w$=400 000 g/mol)

The above aqueous phase was introduced as initial charge at room temperature. The oily phase was added and the mixture dispersed with a high-speed dissolver at 4500 rpm at 40° C. After 40 minutes of dispersing a stable emulsion of particle size from 2 to 12 μm in diameter was obtained. The emulsion was heated from 40° C. to 70° C. over 60 minutes, from 70° C. to 85° C. in the course of a further 60 minutes, all the while being stirred with an anchor stirrer. The microcapsular dispersion formed was cooled to 70° C. with stirring before feed stream 1 was added. Feed stream 2 was added at a metered rate over 100 minutes with stirring at 70° C. This was followed by cooling and addition of the polyelectrolyte (feed stream 3) at a metered rate. The microcapsular dispersion formed had a solids content of 46.0% and an average particle size 4.7 μm (measured using Fraunhofer diffraction, volume average).

EXAMPLE B3

Aqueous Phase
1062 kg of water
531 kg of a 5% by weight solution of hydroxyethylcellulose
132.8 kg of a 10% by weight aqueous polyvinyl alcohol solution (degree of hydrolysis: 79%) (Mowiol® 15-79)
5.9 kg of a 2.5% by weight aqueous sodium nitrite solution
Oily Phase
1230 kg of n-octadecane
68.5 kg of methyl methacrylate
54.8 kg of butanediol acrylate
13.7 kg of dimethylaminoethyl methacrylate
1.96 kg of a 75% by weight solution of t-butyl perpivalate in aliphatic hydrocarbons
Feed Stream 1:
15.0 kg of 10% by weight aqueous t-butyl hydroperoxide solution,
Feed Stream 2:
79.1 kg of 1% by weight ascorbic acid solution,
Feed Stream 3
4.2 kg of 25% by weight sodium hydroxide solution (in water) 4 kg of water
Feed Stream 4
18.7 kg of 30% aqueous thickener solution (Viscalex® HV 30)
Feed Stream 5:
98.4 kg of 50% by weight aqueous phenol sulfonic acid-formaldehyde resin solution ($M_w$=7000 g/mol)

The above aqueous phase was introduced as initial charge at room temperature. The oily phase was added and the mixture dispersed with a high-speed dissolver at 3800 rpm. After 40 minutes of dispersing a stable emulsion of particle size from 2 to 12 μm in diameter was obtained. The emulsion was heated to 70° C. over 60 minutes, to 85° C. in the course of a further 60 minutes and maintained at 85° C. for one hour, all the while being stirred with an anchor stirrer. The microcapsular dispersion formed was admixed with feed stream 1 by stirring. Feed stream 2 was added at a metered rate over 90 minutes with stirring while cooling down to room temperature. Feed streams 3 and 4 were added in succession. Subsequently, the polyelectrolyte (feed stream 5) was added. The microcapsular dispersion formed had a solids content of 42% and an average particle size 5.6 μm (measured using Fraunhofer diffraction, volume average).

EXAMPLE B4

Aqueous Phase
2100 kg of water
443.5 kg of a 5% by weight aqueous hydroxyethylcellulose solution
110.9 kg of a 10% by weight aqueous polyvinyl alcohol solution (degree of hydrolysis: 79%) (Mowiol® 15-79)
4.9 kg of a 2.5% by weight aqueous sodium nitrite solution
Oily Phase
1027.4 kg of n-octadecane
34.3 kg of methyl methacrylate
11.4 kg of butanediol acrylate
68.5 kg of methacrylic acid
1.6 kg of a 75% by weight solution of t-butyl perpivalate in aliphatic hydrocarbons Feed Stream 1:
12.6 kg of 10% by weight aqueous t-butyl hydroperoxide solution
Feed Stream 2:
66.0 kg of 1% by weight aqueous ascorbic acid solution
Feed Stream 3:
34.2 kg of 25% by weight aqueous NaOH solution
3.33 kg of water
Feed Stream 4:
15.6 kg of 30% aqueous thickener solution (Viscalex® HV 30)
Feed Stream 5:
98.4 kg of 50% by weight aqueous phenol sulfonic acid-formaldehyde resin solution ($M_w$=7000 g/mol)

The above aqueous phase was introduced as initial charge at room temperature. The oily phase was added and the mixture dispersed with a high-speed dissolver at 3800 rpm. After 40 minutes of dispersing a stable emulsion of particle size from 2 to 12 μm in diameter was obtained. The emulsion was heated to 70° C. over 60 minutes, to 85° C. in the course of a further 60 minutes and maintained at 85° C. for one hour, all the while being stirred with an anchor stirrer. The microcapsular dispersion formed was admixed with feed stream 1 by stirring. Feed stream 2 was added at a metered rate over 90 minutes with stirring while cooling down to room temperature. Feed streams 3 and 4 were added in succession. Subsequently, the polyelectrolyte (feed stream 5) was added. The microcapsular dispersion formed had a solids content of 30.1% and an average particle size 9.8 μm (measured using Fraunhofer diffraction, volume average).

EXAMPLES B5-B15

Inventive microcapsules were produced from the monomers and polyelectrolytes reported in the table, similarly to example B1. Examples VB5, VB7, VB9, VB11 and VB14 identify the samples before modification with polyelectrolytes. The polyelectrolyte-modified microcapsules are the examples B6, B8, B10, B12, B13 and B15.

Evaporation rate and washout loss are reported in the table. The results illustrate that inventive microcapsules provide distinctly better values with regard to tightness and durability to cleaning.

| Ex. | Total monomer [wt. %] | MMA [wt. %] | MA [wt. %] | BDA-2 [wt. %] | DMAEMA [wt. %] | Solids content [wt. %] | Polyelectrolyte [wt. %] | Evaporation rate [%] | Washout loss [%] |
|---|---|---|---|---|---|---|---|---|---|
| VB5 | 10 | 40 | 20 | 40 | 0 | — | — | 7.3 | — |
| B6 | 10 | 40 | 20 | 40 | 0 | 44 | 5% of polyacrylic acid | 2.9 | — |
| VB7 | 15 | 70 | 5 | 25 | 0 | — | — | 9.1 | 6.4 |
| B8 | 15 | 70 | 5 | 25 | 0 | 45 | 3% of phenolsulfonic acid-formaldehyde resin | 4.1 | 4.1 |
| VB9 | 10 | 50 | 0 | 40 | 10 | — | — | 5.6 | — |
| B10 | 10 | 50 | 0 | 40 | 10 | 45 | 3% of phenolsulfonic acid-formaldehyde resin | 3.3 | — |
| VB11 | 15 | 65 | 10 | 25 | 0 | — | — | 6.9 | — |
| B12 | 15 | 65 | 10 | 25 | 0 | — | 1% of phenolsulfonic acid-formaldehyde resin | 1.1 | — |
| B13 | 15 | 65 | 10 | 25 | 0 | 43 | 3% of polydiallyldimethylammonium chloride | 1.7 | — |
| VB14 | 10 | 30 | 60 | 10 | 0 | — | — | 3.4 | — |
| B15 | 10 | 30 | 60 | 10 | 0 | 30 | 1% of phenolsulfonic acid-formaldehyde resin | 3.1 | — |

MMA: methyl methacrylate; MA: methacrylic acid; BDA-2: 2-butanediol acrylate; DMAEMA: dimethylaminoethyl methacrylate;
Monomer amounts are based on total monomer
Total monomer in % by weight is based on the total amount of capsule core and monomer. Total monomer is a measure of wall thickness. The amount of polyelectrolyte in % by weight is based on the microcapsule (capsule core + monomer + protective colloid)

We claim:

1. A microcapsule comprising a capsule core comprising more than 95% by weight of lipophilic substance and a capsule wall composed of a thermoset polymer and also, disposed on the outer surface of said capsule wall, a polyelectrolyte comprising one or more cationic polyelectrolytes and having an average molecular weight in the range from 500 g/mol to 10 million g/mol.

2. The microcapsule according to claim 1 wherein the quantity of polyelectrolyte is in the range from 0.1% to 10% by weight, based on the total weight of the microcapsule.

3. The microcapsule according to claim 1 wherein the one or more cationic polyelectrolytes comprise vinylimidazolium units.

4. The microcapsule according to claim 1 wherein the polyelectrolyte is selected from polyacrylic acids, phenolsulfonic acid resins, polydiallyldimethylammonium chlorides, polyvinylamines and partially hydrolyzed polyvinylformamides and polyethyleneimines.

5. The microcapsule according to claim 1 wherein the thermoset polymer is selected from crosslinked formaldehydic resins, crosslinked polyureas, crosslinked polyurethanes and methacrylic and acrylic ester polymers.

6. The microcapsule according to claim 1 wherein the capsule wall is constructed from
   10% to 100% by weight of one or more $C_1$-$C_{24}$-alkyl esters of acrylic and/or methacrylic acid (monomers I),
   0% to 80% by weight of a water-insoluble or sparingly water-soluble bi- or polyfunctional monomer (monomers II), and
   0% to 90% by weight of other monomers (monomer III), all based on the total weight of the monomers.

7. The microcapsule according to claim 6 prepared by applying one or more polyelectrolytes onto the surface of a microcapsule comprising a capsule core and a capsule wall constructed of
   10% to 100% by weight of one or more $C_1$-$C_{24}$-alkyl esters of acrylic and/or methacrylic acid (monomers I),
   0% to 80% by weight of a water-insoluble or sparingly water-soluble bi- or polyfunctional monomer (monomers II), and
   0% to 90% by weight of other monomers (monomer III), all based on the total weight of the monomers.

8. The microcapsule according to claim 6 prepared by free radical polymerization of an oil-in-water emulsion comprising the monomers, the lipophilic substance and a protective colloid and subsequent treatment of the microcapsule with a polyelectrolyte and optionally subsequent spray drying.

9. The microcapsule according to claim 1 wherein the capsule wall is constructed from
   30% to 99% by weight of one or more $C_1$-$C_{24}$-alkyl esters of acrylic and/or methacrylic acid (monomers I),
   1% to 70% by weight of a water-insoluble or sparingly water-soluble bi- or polyfunctional monomer (monomers II), and
   0% to 90% by weight of other monomers (monomer III).

10. The microcapsule according to claim 1 wherein the capsule core is a lipophilic substance having a solid/liquid phase transition in the temperature range from −20 to 120° C.

11. The microcapsule according to claim 1 prepared obtainable by applying one or more polyelectrolytes onto the surface of a microcapsule comprising a capsule core and a capsule wall constructed of thermoset polymer.

12. The microcapsule according to claim 1 wherein said lipophilic substance is selected from aliphatic hydrocarbyl compounds, aromatic hydrocarbyl compounds, saturated or unsaturated $C_6$-$C_{30}$-fatty acids, fatty alcohols, $C_6$-$C_{30}$-fatty amines, $C_1$-$C_{10}$-alkyl esters of fatty acids, natural and synthetic waxes and halogenated hydrocarbons.

13. A process for producing a microcapsule according to claim 1 by contacting a microcapsule with one or more polyelectrolytes in an aqueous medium or water.

14. The process for producing a microcapsule according to claim 13 by free radically polymerizing an oil-in-water emulsion comprising the monomers, the lipophilic substance and a protective colloid and subsequently adding one or more polyelectrolytes to the microcapsular dispersion obtained.

15. A method for modifying fibers and textile articles of manufacture comprising applying thereto the microcapsule according to claim 1.

16. A method for modifying mineral bindered building materials comprising applying thereto the microcapsule according to claim 1.

17. A heat transfer fluid comprising the microcapsule according to claim 1.

* * * * *